United States Patent [19] [11] Patent Number: 4,462,283
Ito [45] Date of Patent: Jul. 31, 1984

[54] SCREW DRIVER APPARATUS

[75] Inventor: Yoshikazu Ito, Sagamihara, Japan

[73] Assignee: Nissan Motor Company, Limited, Yokohama, Japan

[21] Appl. No.: 333,452

[22] Filed: Dec. 22, 1981

[30] Foreign Application Priority Data

Jan. 12, 1981 [JP] Japan .............................. 56-1640[U]

[51] Int. Cl.³ .............................................. B25B 23/02
[52] U.S. Cl. .................................... 81/57.37; 81/454; 81/456
[58] Field of Search ...................... 81/57.37, 451, 454, 81/456

[56] References Cited

U.S. PATENT DOCUMENTS 3,918,533 11/1975 Weber ................................ 81/57.37
4,162,639 7/1979 Gill .................................... 81/429
4,236,555 12/1980 Dewey ............................... 81/451

FOREIGN PATENT DOCUMENTS

1403402 10/1968 Fed. Rep. of Germany ..... 81/57.37
258156 4/1968 U.S.S.R. ............................ 81/57.37

Primary Examiner—James L. Jones, Jr.
Attorney, Agent, or Firm—Lane, Aitken & Kananen

[57] ABSTRACT

For screwing a threaded fastener into an internally threaded member, there is disclosed a screw driver apparatus which comprises a casing formed with a through bore to receive the threaded fastener, a tubular member formed with a supplying passageway having a front end open to the through bore for supplying the threaded fastener into the through bore, a screw driver reciprocably and rotatably received in the through bore and having a front end portion to be slidably guided by the through bore and formed with a depression for retaining the threaded fastener therein, and reciprocating means for reciprocating the screw driver with respect to the casing between a first axial position where the front end portion of the screw driver projects outwardly from the casing to force the threaded fastener to be screwed into the internally threaded member and a second axial position where the front end portion of the screw driver is positioned rearwardly of the front end portion of the supplying passageway to allow the threaded fastener to be supplied into the casing through the supplying passageway. The screw driver has a longitudinaly intermediate portion smaller in diameter than the through bore.

8 Claims, 12 Drawing Figures

SCREW DRIVER APPARATUS

FIELD OF THE INVENTION

The present invention relates to a screw driver apparatus for screwing a threaded fastener into an internally threaded member.

SUMMARY OF THE INVENTION

In accordance with the present invention, there is provided a screw driver apparatus for screwing a threaded fastener into an internally threaded member, comprising a casing formed with a through bore to receive the threaded fastener, a tubular member formed with a supplying passageway having a front end open to the through bore for supplying the threaded fastener into the through bore, a screw driver reciprocably and rotatably received in the through bore and having a front end portion to be slidably guided by the through bore and formed with a depression for retaining the threaded fastener therein, drive means for driving the screw driver to rotate and having an output shaft, coupling means for drivably coupling the output shaft of the drive means and the rear end portion of the screw driver, and reciprocating means for reciprocating the screw driver with respect to the casing between a first axial position where the front end portion of the screw driver projects outwardly from the casing to force the threaded fastener to be screwed into the internally threaded member and a second axial position where the front end portion of the screw driver is positioned rearwardly of the front end portion of the supplying passageway to allow the threaded fastener to be supplied into the casing through the supplying passageway, wherein the screw driver has a longitudinally intermediate portion smaller in diameter than the through bore, the longitudinally intermediate portion being located at the front end portion of the through bore of the casing when the leading end of the threaded fastener reaches the internally threaded member between the first and second positions.

BRIEF DESCRIPTION OF THE DRAWINGS

The drawbacks of a prior-art screw driver apparatus and the features and advantages of the screw driver apparatus proposed by the present invention to eliminate such drawbacks will be more clearly understood from the following description in conjunction with the accompanying drawings in which like reference numerals designate similar or corresponding members and structures and in which.

DESCRIPTION OF THE PRIOR ART

For enhancing production efficiency of automotive vehicles in automotive industries in the recent years, many robots have been employed to assemble automatically the automotive vehicles and thus are each equipped with a welding apparatus and a screw driver apparatus. The screw driver apparatus is designed to screw automatically a threaded fastener into an internally threaded member. Such a threaded fastener includes a hexagonal, square or slotted head portion and a threaded stem portion formed with a helical groove thereon.

Figure 1:
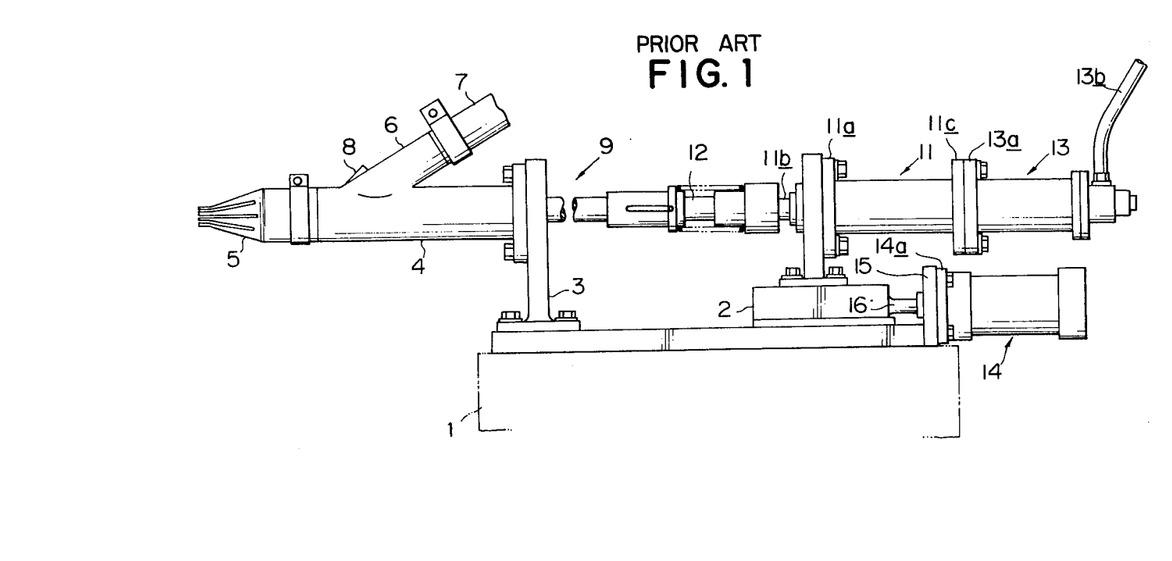
FIG. 1 is a side view of a representative example of the prior-art screw driver apparatus.
Figure 2:
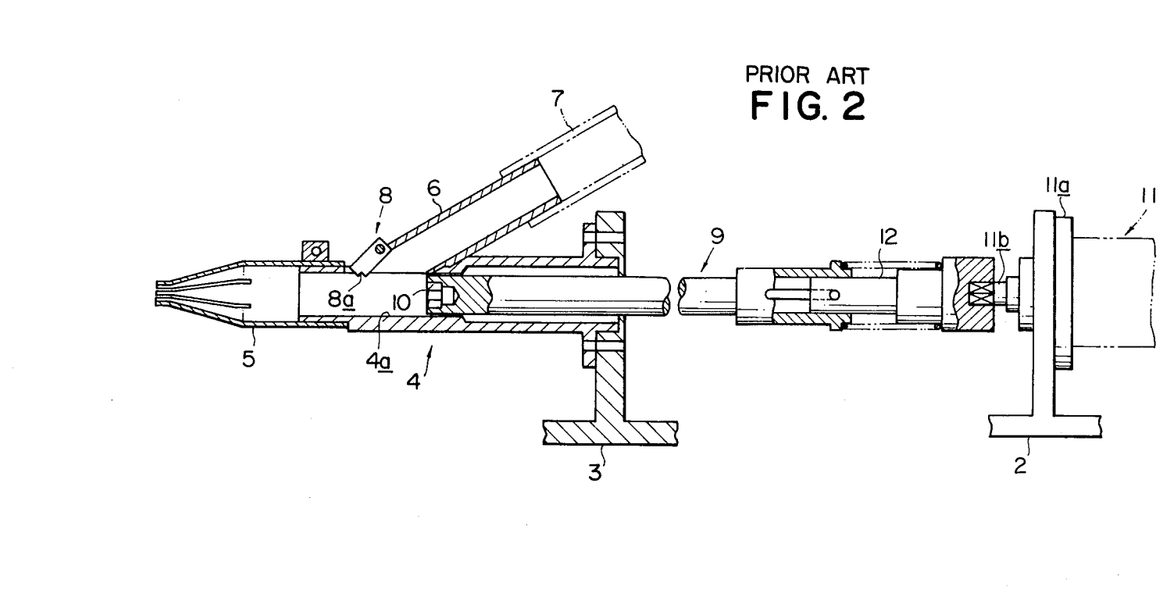
FIG. 2 is a fragmentary longitudinal sectional view showing the prior-art screw driver apparatus illustrated in FIG. 1.

In FIGS. 1 and 2 of the drawings, there is shown a representative example of a prior-art screw driver apparatus which comprises a stationary base structure 1 having a fore-and-aft direction, a slidable bracket member 2 mounted on the stationary base structure 1 and slidable in the fore-and-aft direction of the base structure 1, and a fixed bracket member 3 fixedly mounted on the stationary base structure 1 in front of the slidable bracket member 2 by means of bolts. A cylindrical casing 4 has formed at the rear end thereof a flange portion secured by means of bolts to the fixed bracket member 3 in a cantilever fashion. The cylindrical casing 4 is formed with a through bore 4a to receive a threaded fastener. To the front end of the cylindrical casing 4 is attached a fastener guide member 5 which is tapered toward the front end thereof and which is constructed of a resilient material such as rubber. A fastener supplying tubular member 6 has a front end secured to the cylindrical casing 4 and is rearwardly inclined at an acute angle with respect to the cylindrical casing 4. The tubular member 6 is open at the front end thereof to the through bore 4a of the cylindrical casing 4 and is in communication with the through bore 4a of the cylindrical casing 4. The tubular member 6 is connected to a fastener feed tube 7 through which fasteners are fed intermittently and automatically to the tubular member 6 in such a manner that the head portion of each of the fasteners trails the threaded stem portion thereof. A fastener restraining element 8 has a rear end portion pivotally connected to the tubular member 6 in the vicinity of the cylindrical casing 4 and has a front end portion formed with a step 8a so as to prevent the fastener fed to the cylindrical casing 4 from returning to the tubular member 6. A screw driver 9 is reciprocably and rotatably received in the through bore 4a of the cylindrical casing 4 and has a front end portion to be slidably guided by the through bore 4a. The screw driver 9 is formed at the front end portion with a depression 10 which has a cross section conforming to that of the head portion of the threaded fastener so that the head portion of the threaded fastener is firmly retained in the depression 10. A torque detector 11 has a front flange portion 11a formed at the front end thereof and secured to the slidable bracket member 2 by means of bolts and an output shaft 11b drivably connected to the rear end portion of the screw driver 9 through a coupling device 12. An air motor 13 has a flange portion 13a connected by means of bolts to a rear flange portion 11c of the torque detector 11 formed at the rear end thereof and is connected through an air horse 13b to an suitable air source (not shown). An air-operated cylinder 14 has a flange portion 14a formed at the front end thereof and secured to a support bracket 15 connected to the rear end portion of the base structure 1 by means of bolts. The air-operated cylinder 14 further has a piston rod 16 having a leading end secured to the slidable bracket member 2 so that the slidable bracket member 2 and accordingly the screw driver 9 are caused to reciprocate together with the torque detector 11 and the air motor 13 in the fore-and-aft direction of the base structure 1.

When a threaded fastener is supplied through the fastener feed tube 7 and the tubular member 6 into the through bore 4a of the cylindrical casing 4 while the head portion of the fastener is being trailed by the threaded stem portion under the conditions that the front end portion of the screw driver 9 is retracted rearwardly as shown in FIG. 2, the air motor 13 is operated to rotate and the air-operated cylinder 14 is operated to cause the piston rod 16 to be projected forwardly so that the screw driver 9 is moved forwardly and rotated. Thus, the head portion of the threaded fastener is received in the depression 10 and is thus retained by the screw driver 9 and moved forwardly while rotating together with the screw driver 9. The threaded fastener is forced to move forwardly by the screw driver 9 against the resiliency of the guide member 5 and is then brought into threaded engagement with the internally threaded member. The screw driver 9 has a cross section substantially identical throughout the length thereof so that there is little clearance between the inner surface of the casing 4 and the screw driver 9 throughout the length of the screw driver 9. If, in this instance, a hole formed in the internally threaded member is not in axial alignment with the screw driver 9, the threaded fastener is inclined with respect to the center axis of the hole formed in the internally threaded member. This causes the head portion of the threaded fastener to be disengaged from the depression 10 so that the threaded fastener can not be rotated together with the screw driver 9. Moreover, disengagement of the threaded fastener from the depression results in producing violent impacts and may thus damage the screw driver 9 and the internally threaded member.

The present invention contemplates provision of useful solutions to these drawbacks which have been inherent in the prior-art screw driver apparatus.

DESCRIPTION OF THE EMBODIMENT

FIGS. 3 to 11 of the drawings show a preferred embodiment of the screw driver apparatus according to the present invention aiming at provision of such solutions.

Figure 3:
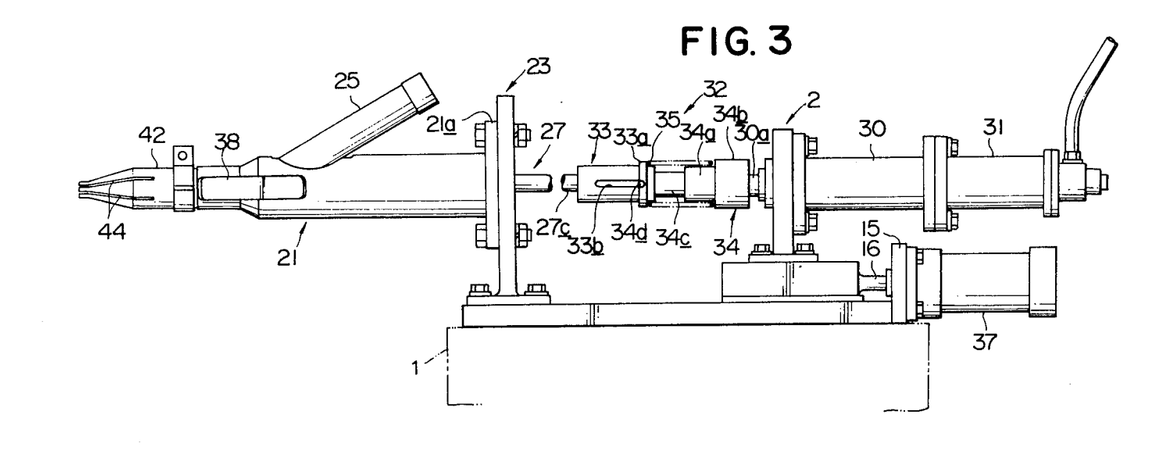
FIG. 3 is a side view showing an embodiment of the screw driver apparatus according to the present invention.
Figure 4:
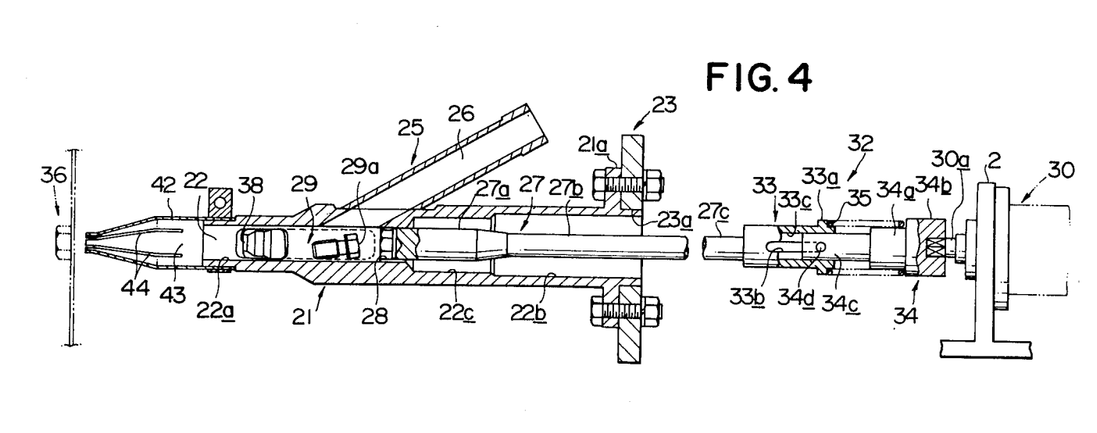
FIG. 4 is a fragmentary longitudinal sectional view of the screw driver apparatus illustrated in FIG. 3.

Referring first to FIGS. 3 and 4, the screw driver apparatus embodying the present invention is shown comprising a cylindrical casing 21 formed with a through bore 22. The through bore 22 is constituted by a small diameter portion 22a formed at the front end portion thereof, a large diameter portion 22b formed at the rear end portion thereof and an intermediate diameter portion 22c formed between the small and large diameter portions 22a and 22b. The cylindrical casing 21 has at its rear end portion a flange portion 21a secured to a fixed bracket member 23 by means of bolts and nuts and has an extension fitted into an aperture 23a formed in the fixed bracket member 23. The fixed bracket member 23 is fixedly mounted on a base structure 1 as in the case of the prior art. A fastener supplying tubular member 25 has a front end secured to the cylindrical casing 21 and is rearwardly inclined at an acute angle with respect to the cylindrical casing 21. The tubular member 25 is formed with a supplying passageway 26 having a front end open at the front end thereof to the small diameter portion 22a of the through bore 22 of the cylindrical casing 21 and thus in communication with the small diameter portion 22a of the through bore 22 of the cylindrical casing 21.

A screw driver apparatus according to the present invention further comprises a screw driver 27 reciprocably and rotatably received in the through bore 22 and having a front end portion 27a substantially equal in diameter to the small diameter portion 22a of the through bore 22 to be slidably guided on the inner surface of the casing 21. The screw driver 27 is formed at its front end portion 27a with a depression 28 for retaining a threaded fastener 29 therein. The depression 28 is so formed as to receive the head portion 29a of the threaded fastener 29 and thus has a configuration permitting the threaded fastener 29 to be rotated together with the screw driver 27. The head portion 29a and the depression 28 have polygonal cross sections conforming to each other. The screw driver further has a longitudinally intermediate portion 27b smaller in diameter than the small diameter portion 22a of the through bore 22.

For driving the screw driver 27 to rotate, the screw driver apparatus according to the present invention further comprises drive means which comprises a torque detector 30 and an air motor 31 which are generally constructed and arranged similar to the prior-art screw driver apparatus and therefore will not be described hereinafter to avoid tedious repetition. The screw driver apparatus according to the present invention further comprises a coupling means for interconnecting the output shaft 30a of the torque detector 30 and the rear end portion 27c of the screw driver 27. The coupling means in the embodiment illustrated in FIGS. 3 to 11 is constituted by a coupling unit 32 comprising a first sleeve member 33 formed with a flange portion 33a radially projecting outwardly from the rear end thereof, a pair of slots 33b, which are 180 degrees disposed from each other, and a through bore 33c in which the rear end portion 27c is fixedly received. The coupling unit 32 further comprises a second sleeve member 34 having a boss portion 34a substantially equal in diameter to the first sleeve member 33 and a large diameter portion 34b formed with a recess in which the front end portion of the shaft 30a is fixedly received. The second sleeve member 34 further has a reduced portion 34c formed at front end thereof with a pair of projections 34d which are 180 degrees disposed from each other and slidably received in the slots 33b, respectively, when the reduced portion 34c is inserted into the through bore 33c. The reduced portion 34c has a diameter smaller than that of the through bore 33c so that the first sleeve member 33 and accordingly the screw driver 27 is permitted to move until the projections 34d in the slots 33b abut to the inner surfaces of the first sleeve member 33 and to slightly incline with respect to the center axis of the reduced portion 34c. The coupling unit 32 further comprises a compression spring 35 provided between the flange portion 33a and the large diameter portion 34b so as to forwardly urge the first sleeve member 33 and the screw driver 27. It is thus to be noted that the screw driver 27 is driven to rotate by the drive means through the coupling means.

The screw driver apparatus according to the present invention further comprises reciprocating means for reciprocating the screw driver 27 with respect to the cylindrical casing 21 between a first axial position where the front end portion 27a of the screw driver 27 projects outwardly from the cylindrical casing 21 to force the threaded fastener 29 to be screwed into internally threaded members 36 and a second axial position where the front end portion 27a of the screw driver 27 is positioned rearwardly of the front end of the supplying passageway 26 to allow the threaded fastener 29 to be supplied into the cylindrical casing 21 through the supplying passageway 26. The reciprocating means in the embodiment illustrated in FIGS. 3 to 11 is constituted by an air-operated cylinder 37 connected to the base structure 1 through the support bracket 15 as in the case of the prior art.

Figure 5:
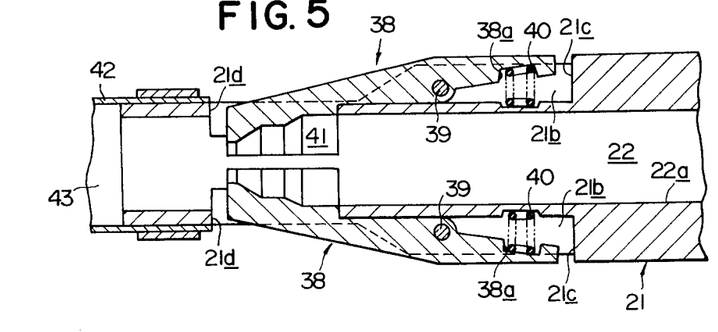
FIG. 5 is a longitudinal sectional view showing, to an enlarged scale, clip members forming part of the screw driver apparatus illustrated in FIG. 3.
Figure 6:
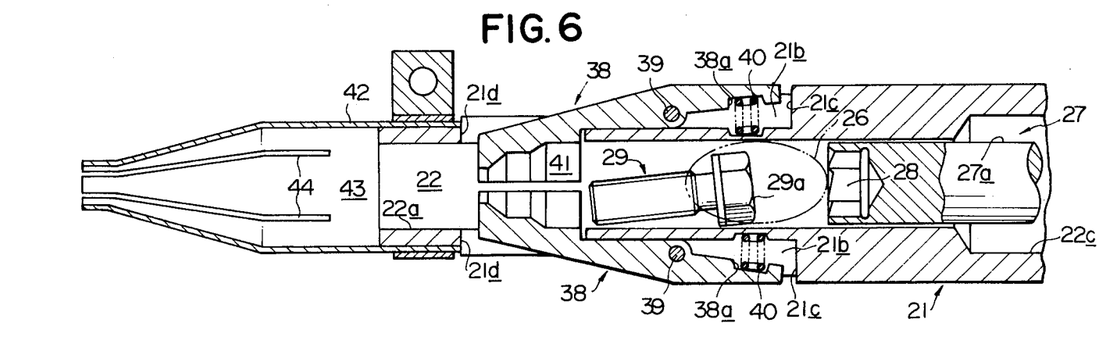
FIG. 6 is a fragmentary longitudinal sectional view showing a first operational condition of the screw driver apparatus illustrated in FIG. 3.
Figure 7:
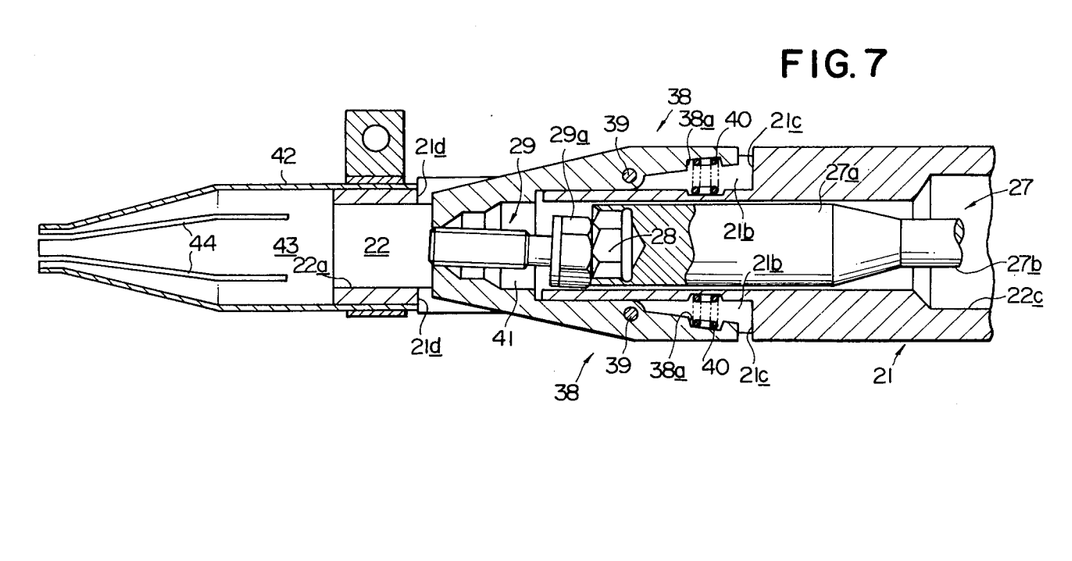
FIG. 7 is a view similar to FIG. 6 but showing a second operational condition of the screw driver apparatus illustrated in FIG. 3.

In order to have the head portion 29a of the threaded fastener 29 received in the depression 28 in the front end portion 27a of the screw driver 27, the screw driver apparatus according to the present invention further comprises positioning means which is constituted by a pair of arcuate clip members 38 partially received in recesses 21b formed in the front end portion of the cylindrical casing 21 and pivotally connected to the wall portion 21c of the cylindrical casing 21 by pivotal pins 39, respectively, as shown in FIG. 5. The clip members 38 are at all times urged at the front end toward each other by means of compression coil springs 40 which are respectively received in grooves 38a formed in the rear end portions of the clip members 38 and the front end portion of the cylindrical casing 21. The front end portion of the cylindrical casing 21 forwardly of the recesses 21b is formed with apertures 21d to receive therein the front end portions of the clip members 38. The front end portions of the clip members 38 are stepped and tapered toward the front end thereof and form in combination a generally cylindrical guide passageway 41 for facilitating the head portion 29a of the threaded fastener 29 to be received in the depression 28 in the front end portion 27a of the screw driver 27.

The screw driver apparatus according to the present invention further comprises threaded fastener guide means for guiding the thread fastener 29 while the screw driver 27 is moving with respect to the casing 21 from the second axial position to the first axial position. The threaded fastener guide means comprises a hollow member 42 secured at its rear end portion to the front end portion of the cylindrical casing 21 and having a guide passageway 43 in communication with the through bore 22 of the cylindrical casing 21. The hollow member 42 is formed with a plurality of slits 44 extending from the forward end to the half way thereof and angularly spaced apart from each other, the guide passageway 43 having a configuration tapered toward the forward end thereof. The hollow member 42 is constructed of a resilient material such as rubber.

Figure 8:
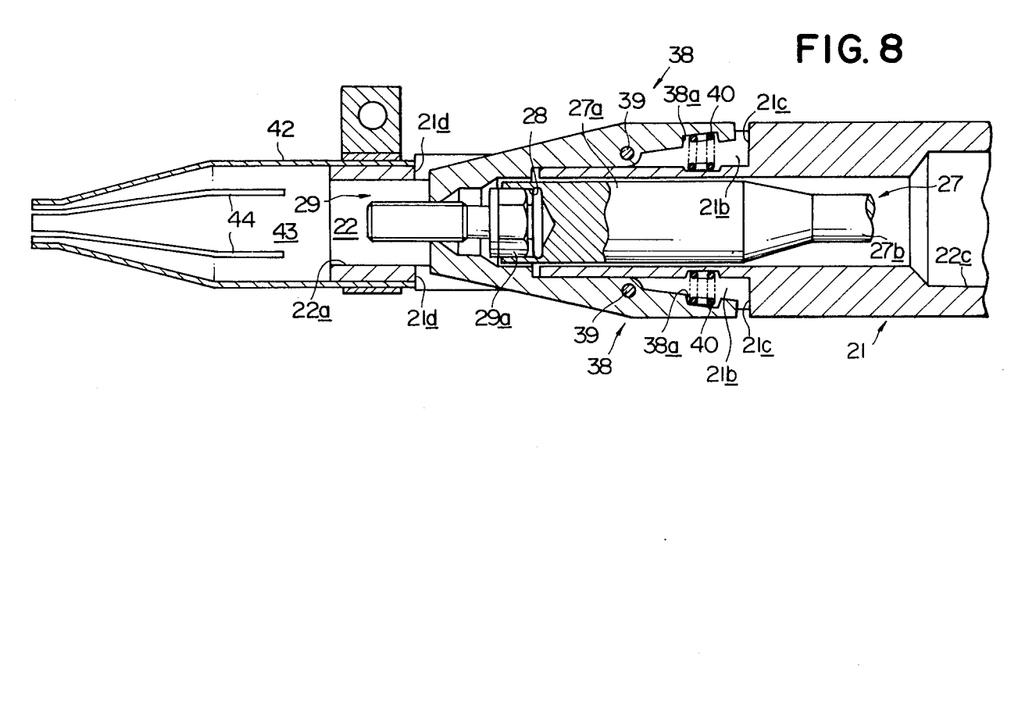
FIG. 8 is a view similar to FIG. 6 but showing a third operational condition of the screw driver apparatus illustrated in FIG. 3.
Figure 9:
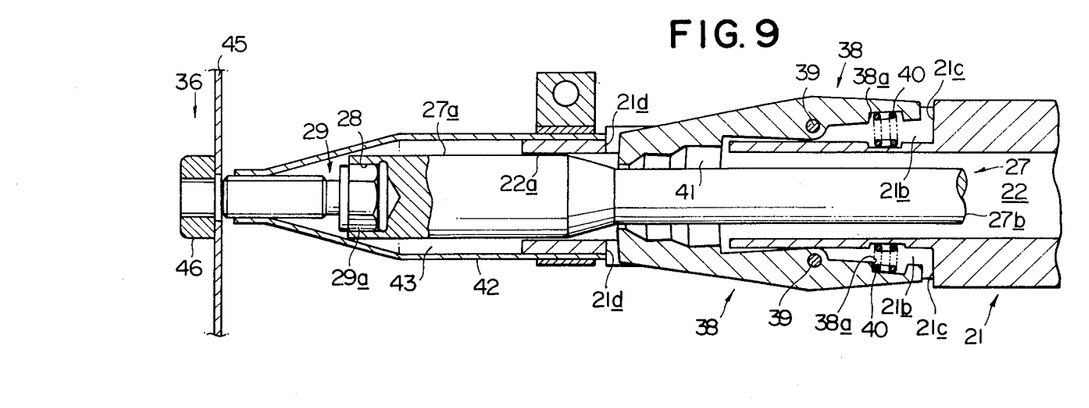
FIG. 9 is a view similar to FIG. 6 but showing a fourth operational condition of the screw driver apparatus illustrated in FIG. 3.
Figure 10:
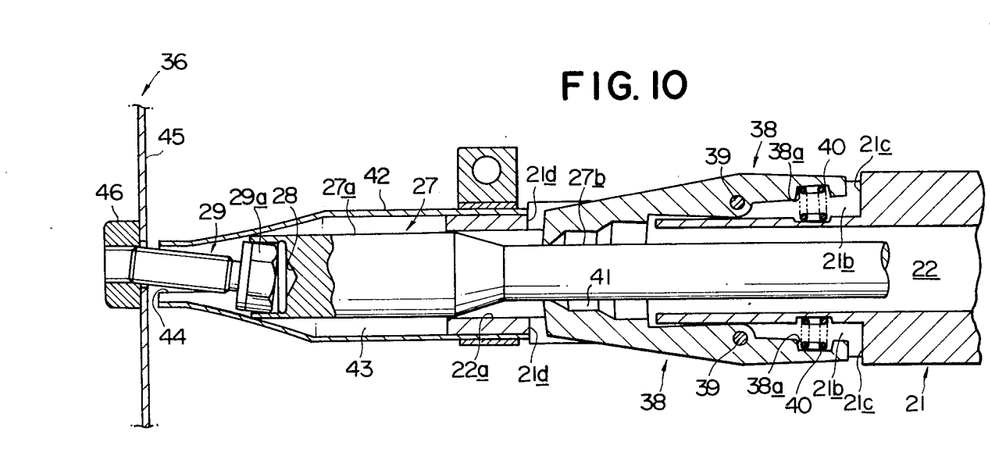
FIG. 10 is a view similar to FIG. 6 but showing a fifth operational condition of the screw driver apparatus illustrated in FIG. 3.
Figure 11:
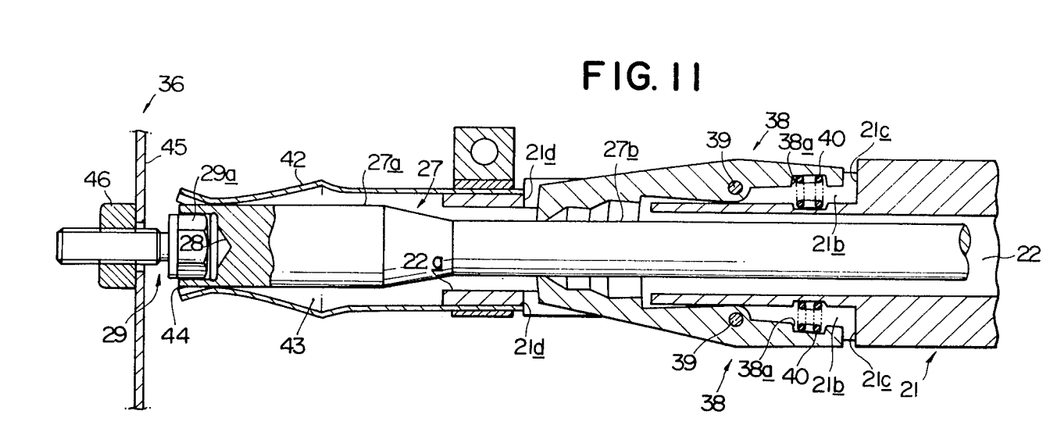
FIG. 11 is a view similar to FIG. 6 but showing a sixth operational condition of the screw driver apparatus illustrated in FIG. 3.

In the screw driver apparatus herein before described, the threaded fastener 29 is supplied into the small diameter portion 22a of the bore 22 through the supplying passageway 26. In this instance, the screw driver 27 assumes the second position so that the threaded fastener 29 is positioned in front of the screw driver 27 as will be seen from FIG. 6. When the threaded fastener 29 is positioned in front of the screw driver 27, the screw driver 27 is caused to rotate and move forwardly by means of the air motor 31 and the air-operated cylinder 37, respectively. This results in that the threaded fastener 29 is forced to move forwardly by the screw driver 27 until the leading end of the threaded fastener 29 reaches the stepped and tapered end portions of the clip members 38. The head portion 29a of the threaded fastener 29 is, however, held in disengagement from the depression 28 of the screw driver 27 during its movement. The leading end portion of the threaded fastener 29 being thus moved to the stepped and tapered portions of the clip members 38, the threaded fastener 29 is forcibly brought into axial alignment with the depression 28 by means of the stepped and tapered portions of the clip members 38 as will be better seen from FIG. 7. In this instance, the head portion 29a of the threaded fastener 29 is able to be received in the depression 28 and thus to be driven for rotation together with the screw driver 27 if the screw driver 27 is slightly moved forwardly. The threaded fastener 29 and the screw driver 27 are driven to rotate together and are moved forwardly through between the front end portions of the clip members 38 as best shown in FIG. 8. The screw driver 27 is guided on the inner surface of the casing 21 during its forward movement (see FIG. 9) since the front end portion 27a of the screw driver 27 is held in contact with the inner surface of the casing 21. When the front end portion of the threaded fastener 29 reaches the front tapered portion of the hollow member 42, the threaded fastener 29 is guided by the inner surface of the front tapered portion of the hollow member 42 and is axially aligned with the holes formed in the internally threaded members 36 such as a panel member 45 and a nut 46. Assuming that the center axes of the holes of the panel member 45 and the nut 46 are offset and misaligned from the center axis of the screw driver 27, the misalignment between the axes of the holes and the screw driver 27 causes the threaded fastener 29 to be inclined from the center axes of the holes as will be seen from FIG. 10 if the leading end of the threaded fastener 29 is forcibly inserted into the hole of the panel member 45. The screw driver 27, however, reaches an axial position in which the intermediate portion 27b of the screw driver 27 is located at the front end of the small diameter portion 22a of the through bore 22 so that the screw driver 27 is able to turn about the center axes of the projections 34d. This results in that the threaded fastener 29 is screwed into the panel member 45 and the nut 46 without disengaging from the screw driver 27 as shown in FIG. 11.

Figure 12:
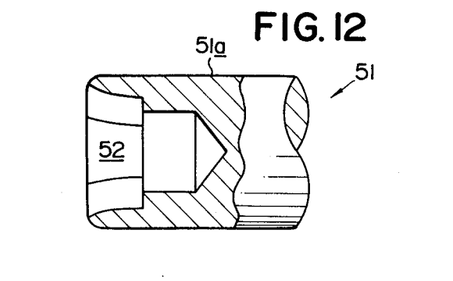
FIG. 12 is a fragmentary longitudinal sectional view showing, to an enlarged scale, a front portion of a screw driver forming part of another embodiment of the screw driver apparatus according to the present invention.

In FIG. 12 of the drawings, there is shown a front end portion 51a of a screw driver 51 forming part of another embodiment of the present invention which is generally constructed and arranged similar to the embodiment shown in FIGS. 3 to 11 except for the arrangement of the front end portion 51a of the screw driver 51. The front end portion 51a is formed with a depression 52 flaring toward the front end thereof so that the head portion 29a received into the depression 52 is permitted to incline with respect to the center axis of the screw driver 51.

While it has been described in the foregoing description that the threaded fastener has a hexagonal head, the head of the threaded fastener may be changed into a square head and any configurations according to the present invention. In lieu of the hexagonal and square heads, a slotted head and a cross recess head may be, of course, used according to the present invention. In these instances, the depression of the screw driver is required to be configured depending upon the configurations of the heads of the fastener members.

What is claimed is:

1. A screw driver apparatus for screwing a threaded fastener into an internally threaded member, comprising:
    a casing formed with a through bore to receive said threaded fastener, the through bore having a center axis passing therethrough,
    a tubular member formed with a supplying passageway having a front end open to said through bore for supplying said threaded fastener into the through bore,
    a screw driver reciprocably and rotatably received in said through bore and having a front end portion to be slidably guided by said through bore and formed with a depression for retaining said threaded fastener therein,
    drive means for driving said screw driver to rotate and having an output shaft,
    coupling means for drivably coupling the output shaft of said drive means and the rear end portion of said screw driver, and
    reciprocating means for reciprocating said screw driver with respect to said casing between a first axial position where said front end portion of said screw driver projects outwardly from said casing to force said threaded fastener to be screwed into said internally threaded member, and a second axial position where said front end portion of said screw driver is positioned rearwardly of said front end of said supplying passageway to allow said threaded fastener to be supplied into said casing through said supplying passageway,
    wherein said screw driver has a longitudinally intermediate portion smaller in diameter than the through bore, the longitudinally intermediate portion being located at the front end portion of said through bore of said casing when the leading end of the threaded fastener reaches said internally threaded member, to cause said screw driver to be inclinable with respect to said center axis of said through bore.

2. A screw driver apparatus as set forth in claim 1, wherein said threaded fastener has a head portion receivable into said depression and wherein said depression has a configuration permitting said threaded fastener to be rotated together with said screw driver.

3. A screw driver apparatus as set forth in claim 2, wherein said head portion and said depression have polygonal cross sections conforming to each other.

4. A screw driver apparatus as set forth in claim 3, wherein said depression is formed flaringly toward the open end thereof.

5. A screw driver apparatus as set forth in claim 1, which further comprises threaded fastener guide means for guiding said thread fastener while said screw driver is moving with respect to said casing from said second axial position to said first axial position.

6. A screw driver apparatus as set forth in claim 5, wherein said threaded fastener guide means comprises a hollow member having a guide passageway in communication with the through bore of said casing and formed with a plurality of slits extending from the front end to the half way thereof and equi-angularly spaced apart from each other, the guide passageway having a configuration tapered toward the front end thereof.

7. A screw driver apparatus as set forth in claim 6, wherein said hollow member is constructed of a resilient material.

8. A screw driver apparatus as set forth in claim 1, which further comprises positioning means constituted by a pair of clip members pivotally received in recesses formed in a front end portion of said casing, the clip members being resiliently urged at all times at their front ends toward each other and pivotable with respect to the casing about a pivot axis in a perpendicular non-intersecting relation with the center axis of said screw driver.

* * * * *